Figure 1:
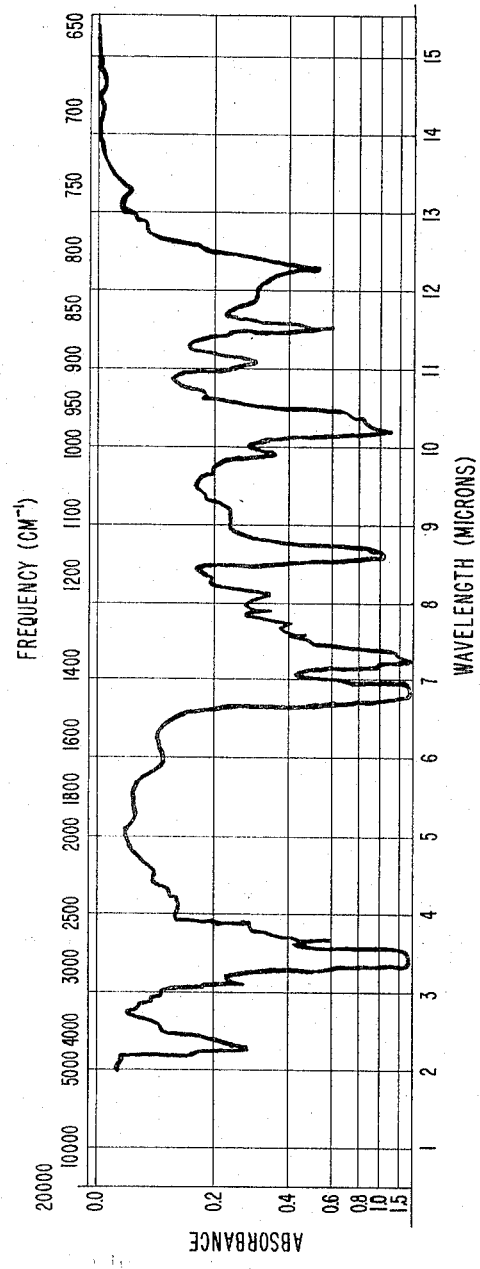

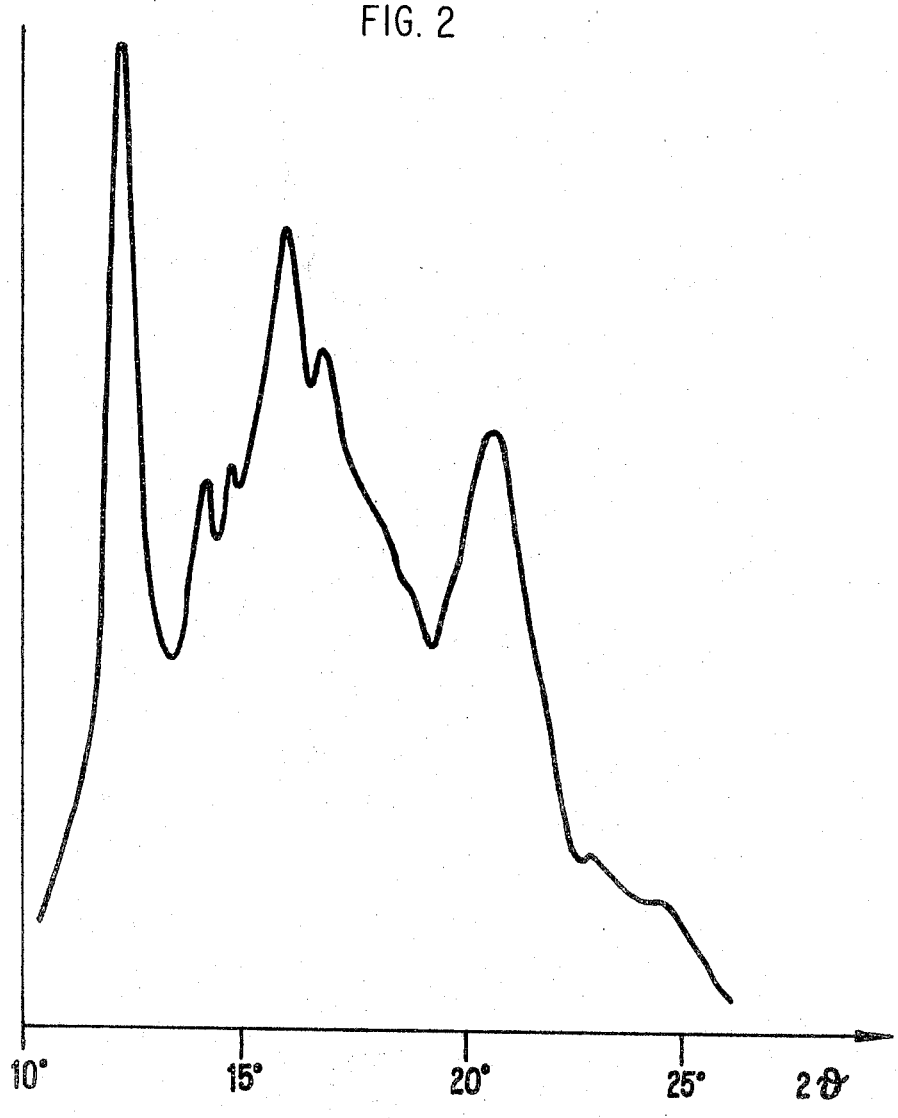

United States Patent Office 3,305,538
Patented Feb. 21, 1967

3,305,538
POLYMERIZATION PROCESS
Giulio Natta, Adolfo Zambelli, and Italo Pasquon, Milan, Italy, assignors to Montecatini Edison S.p.A., Milan, Italy
Filed Nov. 20, 1962, Ser. No. 238,862
Claims priority, application Italy, Nov. 22, 1961, 20,994/61
18 Claims. (Cl. 260—93.7)

The present invention relates to a process for preparing polypropylene having a crystallinity due substantially only to syndiotactic structure, by co-ordinate anionic catalytic polymerization of propylene.

In Italian Patent No. 609,992 there is described a chromatographic separation process for isolating and separating from a crude propylene polymerizate a fraction consisting essentially of macromolecules containing the syndiotactic structure.

The term "syndiotactic structure," as defined and used by G. Natta, and in the art following Natta, indicates a regular head-to-tail structure wherein monomeric units with enantiomorphic steric configurations of the asymmetric carbon atoms regularly follow one another alternately.

According to the present invention it has now been found that by using catalysts obtained from certain vanadium compounds, either halogenated or unhalogenated, and organic aluminum compounds containing at least one halogen atom, it is possible to produce propylene polymers having a crystallinity derived from the presence of substantially only molecules containing the syndiotactic structure, i.e., polymers which substantially do not show a crystallinity due to the presence of macromolecules with the isotactic structure.

It has, in particular, been ascertained that the best results are obtained using catalytic systems consisting essentially of the hydrocarbon soluble reaction product, obtained at temperatures lower than 0° C., from:

(a) a halogen-free vanadium compound, more particularly, vanadium triacetylacetonate, and a metallorganic aluminium compound containing halogens and having the general formula, $AlRX_2$ or $Al_2R_3X_3$, wherein R is an alkyl, aryl, alkylaryl or cycloalkyl group containing up to 10 carbon atoms and X is a halogen selected from the group consisting of fluorine and chlorine, or (b) a halogenated vanadium compound, preferably a compound such as vanadium tetrachloride or vanadium pentafluoride, and a metallorganic aluminum compound having the general formula, $AlR'R''X$ or $Al_2R'_3X_3$, wherein R' and R'' are alkyl, aryl, alkylaryl or cycloalkyl groups containing up to 10 carbon atoms and X is the same halogen, selected from the group consisting of chlorine and fluorine, as that present in the vanadium compound.

When the catalyst is obtained from vanadium triacetyl acetonate and a metallorganic aluminium compound having the formula $AlRX_2$, it is particularly advantageous to carry out the preparation of the catalyst in the presence of complexing agent such as a Lewis base, such as pyridine, tetrahydrofurane, hexamethylphosphor-amide, di- or tri-substituted phosphines, and di- or tri-substituted amines, ethyl ether, anisole, thiophene.

The amount of complexing agents added can vary from 0.25 and 0.5 mol per mole of metallorganic compound; while the molar ratio between metallorganic compound and vanadium compound can vary between 8 and 20, but is preferably about 10.

When, by contrast, the catalyst consists essentially of the reaction product between vanadium triacetylacetonate and aluminum alkyl sesquihalide, the atomic ratio Al/V must be at least 5.

The presence of a Lewis base which functions as a complexing agent is very useful, if not indispensable, even when the catalyst is obtained from vanadium halides. In this case, however, it is convenient to select the complexing agent from the weak Lewis bases, i.e., from the bases which have a heat of complexation with the metallorganic compound of lower than 12,000 cal per mole of metallorganic compound. For instance, there can be employed a compound selected from the class of anisole, diisopropylether, diisobutylether, diphenylsulphide, diphenyl ether, thiophene, N,N-diethylaniline and benzophenone. The molar ratio of vanadium compound to complexing agent in this case is preferably about 1, while the molar ratio of aluminum compound to vanadium compound can vary between 2 and 20. The best results are, however, obtained when this ratio is about 5.

In order to produce a crude polypropylene showing crystallinity due substantially only to syndiotactic structure, it is often convenient to carry out both the catalyst preparation and the polymerization at low temperature, i.e., below 0° C., preferably at temperatures between —30° and —100° C.

The polymerization can be carried out in the presence of an inert solvent as the polymerization medium, e.g., in the presence of suitable aliphatic or aromatic hydrocarbons or mixtures thereof. The polymerization may also be conducted in the absence of inert solvents by using the monomer in the liquid state as the solvent or diluent.

By operating according to the aforedescribed process, propylene polymers are obtained which, upon infrared examination, show the characteristic absorption bands of syndiotactic polypropylene, while the characteristic bands of the ternary isotactic spirals are absent.

More specifically, in addition to the characteristic absorption band at 11.53μ, other characteristic bands are also present such as those at 7.62, 7.91, 9.95 and 12.30μ (FIGURE 1 of the attached drawing).

The X-ray diffraction spectra of the same polymers also shows the presence of several lines characteristic of the syndiotactic structure, more particularly those corresponding to lattice distances of about 7.25 A. (medium-high intensity), 5.3 A. (high intensity) and 4.3 A. (high intensity) (FIGURE 2 of the attached drawing).

In contrast, the line corresponding to the lattice distance of 6.3 A., which is characteristic of isotactic polypropylene, is absent.

The index of the crystallinity due to the syndiotactic structure of the crude polymer is defined by the so-called infra-red crystallinity index or "IR crystallinity index." This index is arbitrarily defined by the following ratio:

$$IR = \frac{A11.53 \times 100}{(A2.32 + A2.35)/2}$$

in which A 11.35 is the absorption read on a base line drawn on the two near windows at about 11.4 and 11.7μ, and A 2.32 and A 2.35 are the absorptions of two near bands, taken as reference since their intensity is almost independent of the structure and physical state of polypropylene.

It has been found in practice that the propylene polymers obtained by the process of the present invention present an IR crystallinity index (for syndiotactic polymer) higher than or at least equal to 85.

The polypropylene with the syndiotactic structure obtained according to the present invention, can be used as a thermoplastic material, especially in cases in which a high elasticity is needed. This polymer can also be used for the production of fibers and films possessing a high elasticity and high tensile strength.

Like atactic polypropylene and ethylene-propylene copolymers, the present polypropylene can be vulcanized, thus obtaining elastomers having mechanical characteristics superior to those of unsaturated rubbers and elastomers obtained from polyisobutylene.

The following examples are given to illustrate the present invention without limiting its scope.

*Example 1*

Into a glass reactor, kept at a constant temperature of $-78°$ C., the following substances are introduced in the following order:

(1) 150 cc. of toluene
(2) 0.00216 mole of vanadium triacetylacetonate
(3) 0.0054 mole of $Al_2(C_2H_5)_3Cl_3$ (Al/V ratio=5)
(4) 130 cc. of liquid propylene.

After 15 hours, during which time the temperature is kept at $-78°$ C. the content of the reactor is coagulated with methanol thus obtaining 4 g. of polymer. This product upon X-ray examination is demonstrated to be crystalline due to the presence of syndiotactic polypropylene macromolecules. The polymer does not exhibit any crystallinity attributable to the isotactic structure. The IR crystallinity index of the product is 90.

*Examples 2 and 3*

Two polymerizaion runs are carried out using a polymerization time of 12 hours under the conditions of Example 1 using the same reactants, but wherein aluminum isobutyl sesquichloride and aluminum neopenthylsesquichoride respectively are employed as the metallorganic compounds, instead of aluminum ethyl sesquichloride. Polymers having an IR crystallinity index (for chains having the syndiotactic structure) of 180 and 200, respectively, are obtained.

The X-ray spectra of the polymers obtained do not indicate the presence of any intensity peaks attributable to crystallinity of isotactic type.

*Example 4*

Into a glass reactor kept at the constant temperature of $-78°$ C., the following ingredients are introduced in the following order:

(1) 100 cc. of toluene
(2) 0.015 mole of $Al(C_2H_5)\ Cl_2$ previously reacted with 0.007 mole of pyridine.
(3) 130 cc. of liquid propylene.

When the reactants reach the desired temperature $(-78°$ C.), 0.0015 mole of vanadium triacetylacetonate dissolved in 5 cc. of toluene (Al/V ratio=10) are introduced.

After 23 hours, during which time the temperature is kept at $-78°$ C., the contents of the reactor are coagulated with methanol thus obtaining 3.6 g. of polymer.

The polymer upon X-ray examination is demonstrated to be crystalline due to the presence of syndiotactic polypropylene macromolecules. The product does not exhibit any crystallinity attributable to isotactic polypropylene macromolecules. The IR crystallinity index is 95.

*Example 5 and 6*

By operating under the conditions of Example 4, two polymerization runs are carried out by using 0.007 moles of tetrahydrofurane and trimethylamine respectively in place of pyridine.

The polymers obtained are shown to exhibit only a crystallinity due to the presence of syndiotactic structure.

*Examples 7 and 8*

Two polymerization runs are carried out with a polymerization time of 22 hours under the conditions of Example 4 while operating with the same reactants, but using aluminum isobutyl dichloride and aluminum neopentyl dichloride, respectively, as metallorganic compounds instead of aluminum ethyl dichloride. The polymers so obtained upon X-ray examination are demonstrated to be crystalline due solely to the presence of syndiotatic polypropylene macromolecules and have an IR crystallinity index of 185 and 200 respectively.

*Example 9*

Into a glass reactor the following ingredients are introduced in the following order:

(1) 100 cc. of toluene
(2) $1 \times 10^{-3}$ moles of vanadium tetrachloride
(3) $1 \times 10^{-3}$ moles of anisole.

After cooling to $-78°$ C., $5 \times 10^{-3}$ moles of $$Al(C_2H_5)_2Cl$$

(Al/V ratio=5) are introduced.

Liquid propylene is then introduced until a volume increase of 100 cc. is obtained.

After 20 hours, during which time the temperature is kept at $-78°$ C., the contents of the reactor are coagulated with methanol thus obtaining 7 g. of polymer.

This product upon X-ray examination is demonstrated to be crystalline due to the presence of syndiotactic polypropylene macromolecules. The polymer does not exhibit any crystallinity attributable to isotactic polypropylene macromolecules.

It is found that upon operating under the conditions shown in this example, but at room temperature, a completely amorphous polymer is obtained.

*Example 10*

By operating as in the preceding example at $-78°$ C., but using 0.00282 mole of $Al(C_2H_5)_2Cl$ (Al/V ratio=3) polymers substantially similar to those obtained in Example 9 are obtained.

*Example 11*

Into a 250 cc. glass reactor kept at $-78°$ C., $10^{-3}$ moles of $VCl_4$ and $10^{-3}$ moles of anisole, dissolved in 100 cc. of toluene, are introduced.

After 10 minutes of thermostatization, $5 \times 10^{-3}$ moles of $Al(iC_4H_9)_2Cl$ are introduced and propylene is then condensed into the polymerization reactor up to a volume increase of 100 cc.

After 14 hours, 2.5 g. of a polymer having an intrinsic viscosity, determined in tetrahydronaphthalene at 135° C., of 0.99 are obtained.

The polymer upon infra-red examination presents the absorption bands characteristic of syndiotactic polypropylene macromolecules; whereas, the bands for the isotactic polypropylene structure are not visible. Analogously, in the X-ray spectra for this polymer only the characteristic intensity maxima for the syndiotactic polypropylene structure are obtained.

*Example 12*

By operating as an Example 11, but using Al (neopenthyl)$_2$Cl instead of $Al(iC_4H_9)_2Cl$, 2.5 g. of a polymer having an intrinsic viscosity of 0.78 is produced. Upon infra-red examination (FIG. 1) the polymer presents only the absorption bands characteristic of syndiotactic polypropylene macromolecules and in addition the X-ray spectrum (FIG. 2) exhibits only the characteristic intensity maxima of syndiotactic polypropylene marcomolecules. The IR crystallinity index (of syndiotactic polymer) is 175.

Example 13

Into a 250 cc. glass reactor kept at the constant temperature of $-78°$ C., the following ingredients are introduced:

100 cc. of n-heptane,
$10^{-3}$ moles of anisol,
$10^{-3}$ moles of vanadium tetrachloride and
$5 \times 10^{-3}$ moles of $Al(iC_4H_9)_2Cl$.

120 cc. of liquid propylene are then introduced. After 19 hours, during which time the temperature is kept at $-78°$ C., 3 g. of polymer are obtained.

This polymer, upon X-ray examination presents a crystallinity due only to the syndiotactic structure. The IR index is 195, while the intrinsic viscosity (determined in tetrahydronaphthalene at 135° C.) is 0.606.

Example 14

By operating as in the preceding Example 13, but using $Al(neopenthyl)_2Cl$, instead of $Al(iC_4H_9)_2Cl$, a polymer having an intrinsic viscosity of 0.65 and an IR crystallinity index of 195 is obtained.

Examples 15–18

By operating as in Example 13, four polymerization runs are carried out using all the same reactants, but wherein anisole is replaced with $10^{-3}$ mols of thiophene, $10^{-3}$ mols of diisopropylether, $10^{-3}$ moles of N-N-diethylaniline and $10^{-3}$ moles of benzophenone, respectively.

In each of the four cases polymers whose crystallinity is due only to syndiotactic structure are produced.

Examples 19–23

By operating as in Example 13, five polymerization runs are carried out using the same reactants but wherein instead of anisole, $10^{-3}$ moles of pyridine, trimethylamine, isoquinoline, tetrahydrofurane and hexamethylphosphoramide, respectively, are used.

Only traces of completely amorphous polymers are produced in each case.

Example 24

Into a 400 cc. reactor kept at the constant temperature of $-78°$ C., the following ingredients are introduced:
200 cc. of toluene
$2 \times 10^{-3}$ moles of vanadium tetrachloride
$2 \times 10^{-3}$ moles of anisol
$10 \times 10^{-3}$ moles of aluminum di-alpha-methyl styryl monochloride
80 grams of propylene After 24 hours, during which time the reactor is kept at $-60°$ C., 8.9 g. of polypropylene, having an intrinsic viscosity $[\eta]$ of 1.2 (determined in tetrahydronaphthalene at 135° C.) are obtained.

The IR index is 85.

Example 25

By operating as in Example 24, but using aluminum di-benzyl-monochloride 10 g. of polymer which shows at the X-rays crystallinity due only to macromolecules having syndiotactic structure are obtained.

Many modifications and variations can, of course, be practiced without departing from the scope and spirit of the present invention.

Having thus described the present invention, what we desire to secure and claim by Letters Patent is:

1. A process for preparing polypropylene showing crystallinity at the X-rays, the crystallinity resulting substantially exclusively from the syndiotactic structure, which comprises polymerizing the propylene at a temperature below 0° C. in the presence of a catalytic system comprising a hydrocarbon soluble reaction product obtained by reacting vanadium triacetylacetonate, a strong Lewis base and an organic halide aluminum compound of the formula $AIRX_2$ wherein R is selected from the group consisting of alkyl, aryl, alkylaryl, and cycloalkyl groups having up to 10 carbon atoms and X is selected from the group consisting of chlorine and fluorine.

2. The process of claim 1 further characterized in that the Lewis base is selected from the group consisting of pyridine, tetrahydrofurane, hexamethylphosphoramide, disubstituted phosphines, tri-substituted phosphines, disubstituted amines, tri-substituted amines, ethyl ether, anisole and thiophene.

3. The process of claim 1 further characterized in that the molar ratio of the Lewis base to the metallorganic aluminum compound ranges from about 0.25 to 0.5.

4. The process of claim 1 further characterized in that the molar ratio of the metallorganic aluminum compound to the vanadium compound ranges from about 8 to 20.

5. The process of claim 1 further characterized in that the polymerization is carried out at a temperature ranging from about $-30°$ to $-100°$ C.

6. The process of claim 1 further characterized in that the polymerization is carried out in the presence of a hydrocarbon solvent.

7. A process according to claim 1 in which the catalyst is prepared at a temperature below 0° C.

8. A process for preparing polypropylene showing crystallinity at the X-rays, the crystallinity resulting substantially exclusively from the syndiotactic structure which comprises polymerizing the propylene at a temperature below 0° C. in the presence of a catalytic system comprising a hydrocarbon soluble reaction product obtained by reacting vanadium triacetylacetonate and an organic halide aluminum compound of the formula $Al_2R_3X_3$ wherein R is selected from the group consisting of alkyl, aryl and alkylaryl and cycloalkyl groups having up to 10 carbon atoms and X is selected from the group consisting of chlorine and fluorine wherein the aluminum to vanadium atomic ratio is at least 5, in the absence of a Lewis base.

9. The process of claim 8 further characterized in that the polymerization is carried out at a temperature ranging from about $-30°$ to $-100°$ C.

10. The process of claim 8 further characterized in that the polymerization is carried out in the presence of a hydrocarbon solvent.

11. A process according to claim 8 in which the catalyst is prepared at a temperature below 0° C.

12. A process of preparing polypropylene showing crystallinity at the X-rays, the crystallinity resulting exclusively from the syndiotactic structure which comprises polymerizing the propylene at a temperature below 0° C. in the presence of a catalytic system comprising a hydrocarbon soluble reaction product obtained by reacting a halogenated vanadium compound selected from the group consisting of $VCl_4$ and $VF_5$ and an aluminum organic halide compound selected from the group consisting of $AlR'R''X$ and $Al_2R'_3X_3$ wherein R' and R'' are selected from the group consisting of alkyl, aryl, alkylaryl and cycloalkyl groups having up to 10 carbon atoms and X is the same halogen as in the halogenated vanadium compound and is selected from the group consisting of chlorine and fluorine, in the presence of a weak Lewis base which has a heat of complexation with the metalorganic halide compound below 12,000 calories per mole of metalorganic compound.

13. The process of claim 12 characterized in that the weak Lewis base is selected from the group consisting of anisole, diisopropylether, diisobutylether, diphenylsulphide, diphenylether, thiophene, N, N-diethylaniline and benzophenone.

14. The process of claim 12 further characterized in that the molar ratio of the vanadium compound to the Lewis base is 1.

15. The process of claim 12 further characterized in that the molar ratio of the metallorganic aluminum compound to the vanadium compound ranges from about 2 to 20.

16. The process of claim 12 further characterized in that the polymerization is carried out at a temperature ranging from about $-30°$ to a $-100°$ C.

17. The process of claim 12 further characterized in that the polymerization is carried out in the presence of a hydrocarbon solvent.

18. A process according to claim 12 in which the catalyst is prepared at a temperature below $0°$ C.

References Cited by the Examiner

UNITED STATES PATENTS

| 2,886,561 | 5/1959 | Reynolds | 260—94.9 |
| 2,954,367 | 9/1960 | Vandenberg | 260—88.1 |
| 2,956,991 | 10/1960 | Coover et al. | 260—93.7 |

OTHER REFERENCES

Natta, Scientific American, vol. 197, No. 3, September 1957, pp. 98–104.

JOSEPH L. SCHOFER, *Primary Examiner.*

M. B. KURTZMAN, *Assistant Examiner.*